(No Model.) 3 Sheets—Sheet 3.
T. A. RASMUSON.
CORN PLANTER.
No. 286,486. Patented Oct. 9, 1883.
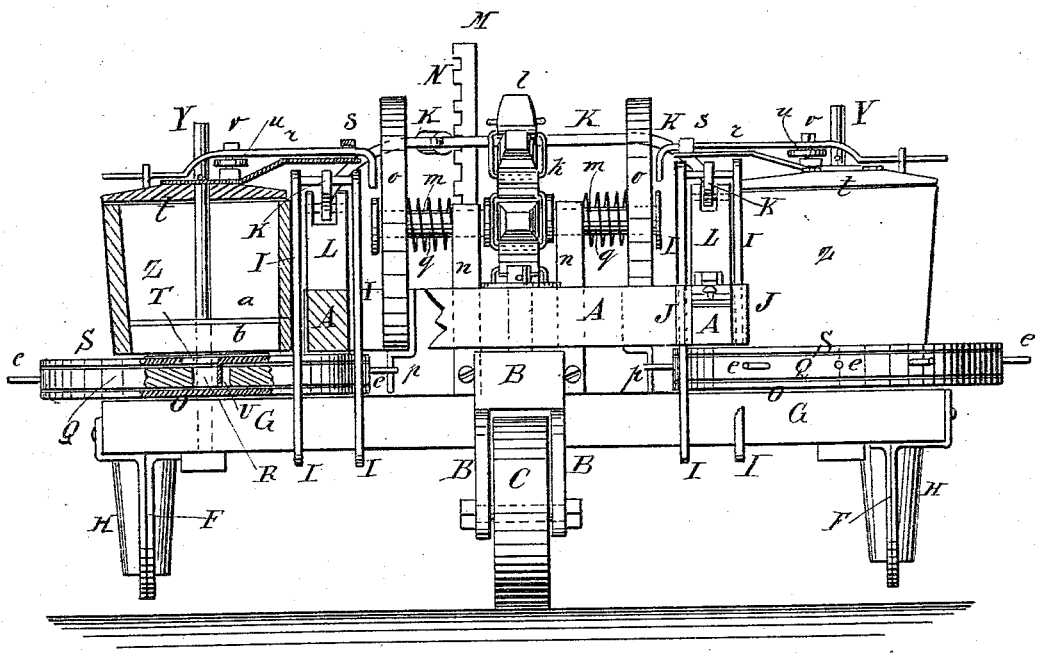
WITNESSES:
INVENTOR:
T. A. Rasmuson
BY Munn & Co
ATTORNEYS.

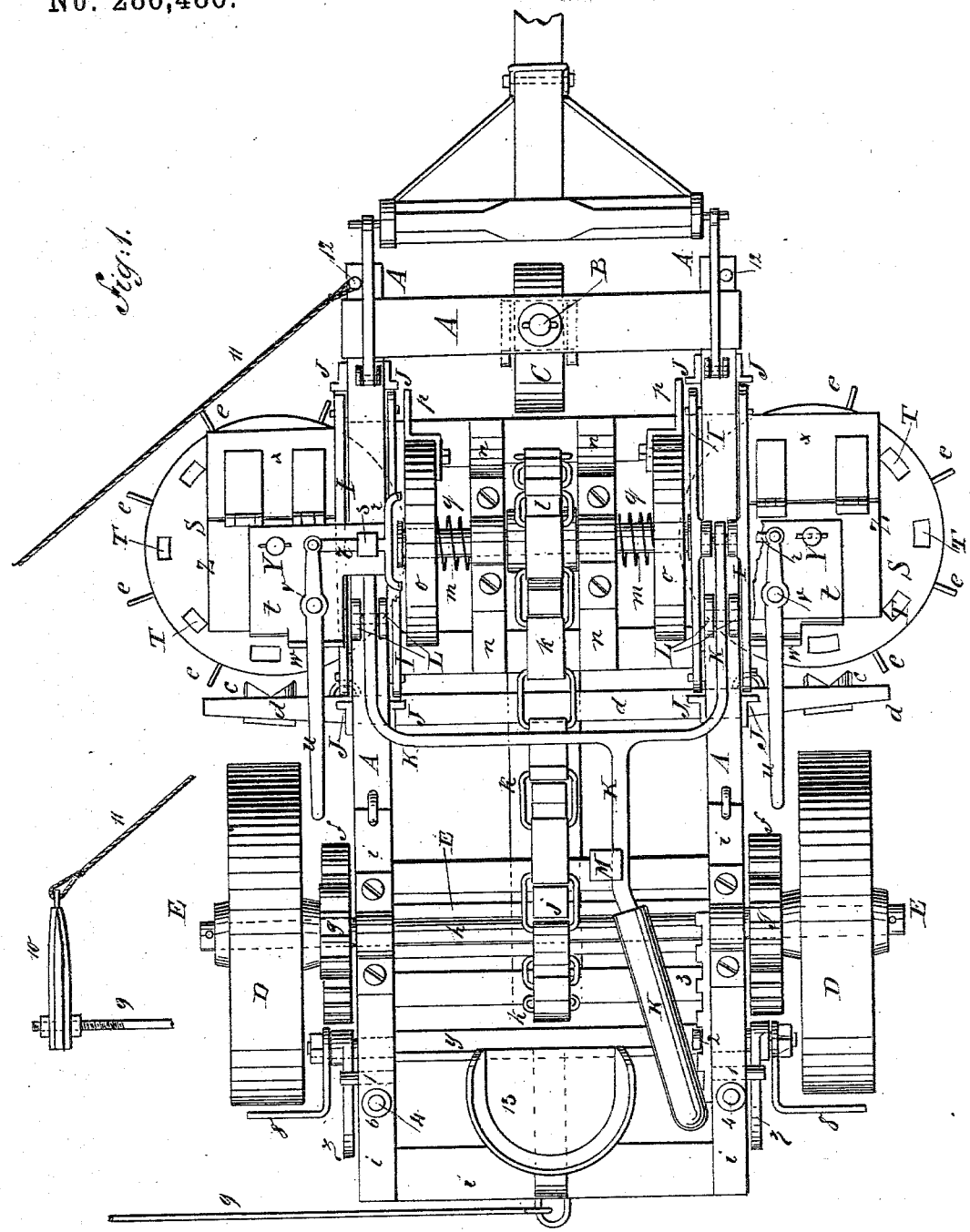

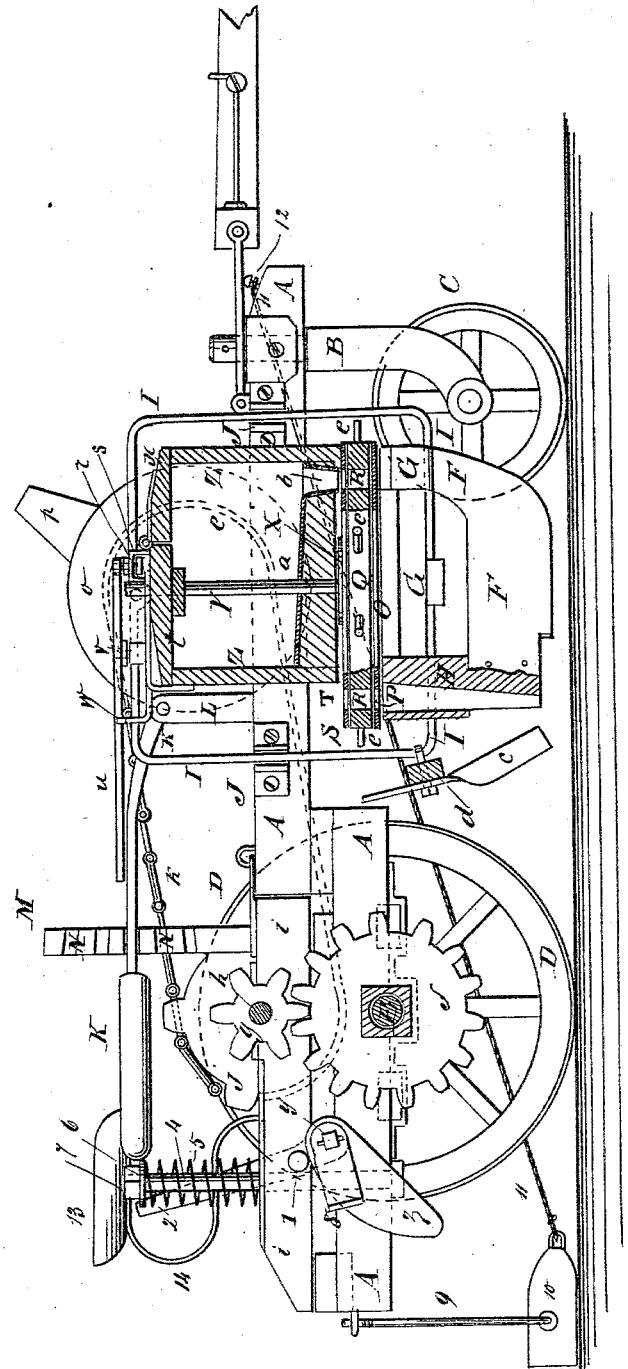

UNITED STATES PATENT OFFICE.

THOMAS A. RASMUSON, OF FOREST CITY, IOWA.

CORN-PLANTER.

SPECIFICATION forming part of Letters Patent No. 286,486, dated October 9, 1883.

Application filed February 23, 1883. (No model.)

*To all whom it may concern:*

Be it known that I, THOMAS A. RASMUSON, of Forest City, in the county of Winnebago and State of Iowa, have invented a new and useful Improvement in Corn-Planters, of which the following is a full, clear, and exact description.

Reference is to be had to the accompanying drawings, forming a part of this specification, in which similar letters of reference indicate corresponding parts in all the figures.

Figure 1, Sheet 1, is a plan view of my improvement. Fig. 2, Sheet 2, is a sectional side elevation of the same, parts being broken away. Fig. 3, Sheet 3, is a front elevation of the same, partly in section and parts being broken away. Fig. 4, Sheet 3, is a plan view of one of the seed-dropping wheels. Fig. 5, Sheet 3, is a sectional elevation of a part of the same, taken through the curved line $x\ x$, Fig. 4. Fig. 6, Sheet 3, is a section on line $y\ y$ of Fig. 4.

The object of this invention is to facilitate the accurate planting of corn and other seeds planted in hills.

The invention has for its further object to promote convenience in controlling and operating the planter.

The invention consists in the peculiar construction and arrangement of parts, as hereinafter fully described, and pointed out in the claims.

A represents the main frame of the machine, which is made with a downward offset a little in the rear of its center.

To the center of the forward cross-bar of the frame A is pivoted the standard B of the caster-wheel C, by which the forward end of the machine is supported.

The rear end of the machine is supported by the wheels D, to the axle E of which the rear part of the frame A is attached.

Channels are opened to receive the seed by the runners F, the forward ends of which are extended upward, and are attached to the frame G. The rear ends of the runners F are forked, and to them are attached the lower ends of the standards H, which are perforated longitudinally, to adapt them to serve as spouts to conduct the seed into the channels opened by the runners F. The lower parts of the passages through the standards H are open at the rear side of the said standards, to allow the seed to be seen as it falls to the ground.

To the frame G are attached the bottom bars of upright frames I, the upright bars of which slide in keepers J, attached to the frame A.

To the centers of the top bars of the frames I are pivoted the ends of the branches of the forked lever K, which branches are fulcrumed to supports L, attached to the frame A, so that the runners F can be raised and lowered by operating the lever K. The free end of the lever K extends to the rearward into such a position that it can be readily reached and operated by the driver from his seat. The rear part of the lever K moves up and down along an upright bar, M, in the side of which are formed a number of notches, N, to receive the said lever K, so that the runners F will be held securely in any position into which they may be adjusted.

To the end parts of the frame G are attached annular plates O, in which are formed openings P, directly over the upper ends of the passages through the standards H, so that the seed can pass through the said openings into the said passages in the standards.

Upon the plates O rest annular wheels Q, in which, near their rims, and in such positions as to come successively over the openings P, is formed a series of openings, R, to receive seed from the seed-boxes and carry it to the said openings P.

Upon the annular wheels Q are placed annular plates S, which have openings T formed through them, corresponding in number, position, and size with the openings R. The plates S, at the end of the openings T, have tongues U formed upon or attached to them, which project downward into the openings R, so that by adjusting the plates S the size of the said openings R can be adjusted to receive more or less seed, as may be required. The plate S is secured in place upon the annular wheel Q by screws V, which pass through slots W in the said plate S and screw into the said wheel Q, so that the said plate can be readily adjusted, and when adjusted will be held securely in place. The annular wheels Q revolve upon circular bearings X, placed and fitted into the circular openings of the said wheels Q. The bearings X are attached to the frame G, or to upright pins, bolts, or shafts Y, secured to the said frame, and which pass up through the centers of the said bearings and through the seed-boxes Z. The seed-boxes Z are secured in place by pins passed through or nuts screwed upon the upper ends of the pins Y. The bearings X are made a little thicker than the wheels Q and plates S, as shown in Figs. 2 and 6, so that the bottoms of the seed-boxes Z will be supported out of contact with the said plates S. The bottom $a$ of each seed-box Z is slightly inclined toward its forward end, and has a slot, $b$, formed in it at or near its forward end and directly over the openings R of the seed-dropping wheels Q, so that the seed will readily pass into the said openings. The seed-dropping wheels Q are kept from carrying out any more seed than enough to fill their openings R by brushes or other cut-offs attached to the said seed-boxes Z, but which are not shown in the drawings.

If desired, the seed-boxes may be provided with agitators to cause the seed to pass readily into the slot $b$, and thus enter the openings R of the wheels Q. The channels opened by the runners F are filled with soil, and the seed is covered by coverers $c$, attached to a cross-bar, $d$, which is connected with the upright frames I, so as to be raised and lowered with and by the said frames.

To the rims of the seed-dropping wheels Q are attached radially-projecting pins or arms $e$, which are placed at equal distances apart, and are equal in number to the seed-dropping openings R of the said wheels.

To the inner ends of the hubs of the drive-wheels D are attached large gear-wheels $f$, the teeth of which mesh into the teeth of the small gear-wheels $g$, attached to the ends of the shaft $h$. The shaft $h$ revolves in bearings attached to the frame $i$, which is fitted into the offset of the frame A, and is hinged at its forward corners to the shoulders of the said offsets.

To the center of the shaft $h$ is attached a chain-wheel, $j$, around which passes an endless chain, $k$, which also passes around a chain-wheel, $l$, attached to the center of a shaft, $m$. The shaft $m$ revolves in bearings attached to supports $n$, secured to the frame G, so that the said shaft and chain-wheel $l$ will be carried with the said frame as it is raised and lowered to adjust the runners F.

Upon the ends of the shaft $m$ are placed wheels $o$, which are connected with the said shaft by tongues and grooves, or other suitable means, that will cause the wheels to be carried around by and with the shaft, while allowing the said wheels to slide longitudinally upon the said shaft.

To the wheels $o$ are attached one or more radially-projecting arms, $p$, which, as the said wheels $o$ are revolved, come in contact with the radially-projecting arms $e$ of the seed-dropping wheels Q, and turn the said wheels through the space between two adjacent arms, $e$, so that seed for a hill will be dropped at each revolution of the wheels $o$, when the said wheels are each provided with one arm $p$. The space between the hills can be varied by varying the number of arms $p$ attached to the wheels $o$, or by changing the relative sizes of the chain-wheels $j$ $l$, or of the gear-wheels $f$ $g$. The wheels $o$ are held outward or in gear with the seed-dropping wheels Q by springs $q$, placed upon the shaft $m$, and interposed between the said wheels $o$ and the bearings of the said shaft $m$. The wheels $o$ are pushed inward, to throw them out of gear with the seed-dropping wheels Q, by push-bars $r$, which slide in guides $s$, attached to the stationary parts $t$ of the seed-box covers or the frames I. The push-bars $r$ are pivoted to the forward ends of levers $u$, by means of which the said bars $r$ are pushed against and withdrawn from the wheels $o$. The levers $u$ are fulcrumed to pins $v$, attached to the parts $t$ of the seed-box covers, and are held in either position by a catch plate or bar, $w$, also attached to the said stationary parts of the seed-box covers. The rear ends of the levers $u$ project into such positions that they can be reached and operated by the driver from his seat. This construction allows either of the seed-dropping wheels $o$ to be thrown into and out of gear, while allowing the other wheel to operate—as, for instance, when one of the rows is to be longer than the other, or when a single row is to be planted at the side of a field. The forward parts, $x$, of of the seed-box covers are hinged at their rear edges to the forward edges of the stationary parts $t$ of the said covers, so that convenient access can be had to the interior of the seed-boxes.

In bearings attached to the upper side of the rear part of the frame A, beneath the rear part of the hinged frame $i$, rocks a shaft, $y$, the ends of which project at the sides of the said frames A $i$.

To the ends of the shaft $y$ are attached cams $z$, which, when the shaft $y$ is turned in one direction, act against pins 1, attached to the outer sides of the side bars of the frame $i$, throwing the gear-wheels $g$ out of gear with the gear-wheels $f$, so that the machine can be drawn from place to place without operating the seed-dropping mechanism. The shaft $y$ is operated by a lever, 2, which projects into such a position that it can be conveniently reached and operated by the driver from his seat. The lever 2 moves along the notched edge of a catch-bar, 3, attached to a side bar of the frame $i$, so that the said lever will be held securely in any position into which it may be adjusted.

To the rear parts of the side bars of the frame A are attached uprights 4, which pass up through slots in the rear parts of the side bars of the frame $i$.

Upon the upper parts of the uprights 4 are placed spiral springs 5, the upper ends of which rest against washers 6, placed upon the upper ends of the said uprights 4, and resting against nuts 7, screwed upon the upper ends of the said uprights. The lower ends of the springs 5 rest upon the upper sides of the side bars of the frame $i$, for holding wheels $f$ $g$ in gear.

To the outer ends of the rock-shaft $y$ are attached plates 8, which are so formed that when the shaft $y$ is in its normal position the said plates will be in position to act as scrapers to remove any soil that may adhere to the rims of the drive-wheels D.

To the center of the rear cross-bar of the frame $i$ is hinged the end of a rod, 9, in such a manner that the said rod can be turned down at either side of the machine.

To the outer end of the rod 9 is attached a double runner, 10, the upper and lower sides of which are alike, and are so formed that either will mark the ground.

To the forward end of the double runner or marking-block 10 is attached the rear end of the cord 11, the forward end of which has a loop formed upon it or a ring attached to it, which loop or ring is hooked upon one or the other of the pins 12 or other supports attached to the forward ends of the side bars of the frame A, according as the marker is arranged at one or the other side of the machine. The rod 9 is made of such a length that the marker 10 will follow the row of hills last planted, when the machine is in proper position to plant the rows at the proper distance apart.

13 is the driver's seat, which is attached to the upper end of the spring-standard 14. The lower end of the standard 14 is attached to the rear part of the frame $i$.

Having thus described my invention, I claim as new and desire to secure by Letters Patent—

1. In a corn-planter, the combination, with the seed-box Z, of the seed-dropping wheel Q S and the bearing X, made thicker than said wheel, substantially as herein shown and described.

2. In a corn-planter, the combination, with the frame G and the runners F, of the vertically-sliding frame I, attached to the frame G, and the forked lever K, having its branches fulcrumed to the frame of the machine and pivoted to the frame I, substantially as herein shown and described.

3. In a corn-planter, the combination, with the frame G, the runners F, the vertically-sliding frame I, and means for raising said frames and runners, of the cross-bar $d$, secured to the frame I, and the coverers $c$, secured to the cross-bar, substantially as herein shown and described, whereby the coverers are raised and lowered with the runners, as set forth.

4. In a corn-planter, the combination, with the seed-box Z, having discharge-opening $b$, of the frame G, the runners F, having perforated standards H, the ring-plate O, provided with openings P, the dropping-wheel Q S, provided with openings R T, and means for revolving the said dropping-wheel, substantially as herein shown and described.

5. In a corn-planter, the combination, with dropping-wheel Q, provided with the radial arms $e$, of the shaft $m$, the wheels $o$, mounted loosely on said shaft, and provided with the radial arms $p$, the spring $q$, and means for rotating the shaft and sliding the wheels $o$ thereon, substantially as herein shown and described.

6. In a corn-planter, the combination, with the dropping-wheel Q, provided with the radial arms $e$, the shaft $m$, and means for operating said shaft, of the loosely-mounted wheels $o$, provided with the radial arms $p$, the spring $q$, the forked push-bar $r$, and the lever $u$, substantially as herein shown and described.

7. In a corn-planter, the combination, with the frame A and the hinged and spring-pressed frame $i$, provided with the pins 1, of the shaft $y$, the cams $z$, and the lever 2, substantially as herein shown and described.

8. In a corn-planter, the combination, with the frame A and the hinged frame $i$, of the standards 4, secured to the frame A and passing up through the frame $i$, the washers 6, and the springs 5, surrounding said standards, substantially as herein shown and described.

THOMAS A. RASMUSON.

Witnesses:
MANDIUS JOHNSON,
OLE THORSEN.